(12) United States Patent
Matian et al.

(10) Patent No.: US 12,261,340 B2
(45) Date of Patent: Mar. 25, 2025

(54) FUEL CELL STACK WITH COMPRESSION MEANS

(71) Applicant: EH GROUP ENGINEERING AG, Prangins (CH)

(72) Inventors: Mardit Matian, Prangins (CH); Alexandre Chainho, Sombacour (CH)

(73) Assignee: EH GROUP ENGINEERING AG, Nyon (CH)

( * ) Notice: Subject to any disclaimer, the term of this patent is extended or adjusted under 35 U.S.C. 154(b) by 123 days.

(21) Appl. No.: 17/428,689

(22) PCT Filed: Feb. 6, 2020

(86) PCT No.: PCT/IB2020/050962
§ 371 (c)(1),
(2) Date: Aug. 5, 2021

(87) PCT Pub. No.: WO2020/161668
PCT Pub. Date: Aug. 13, 2020

(65) Prior Publication Data
US 2022/0115685 A1    Apr. 14, 2022

(30) Foreign Application Priority Data
Feb. 7, 2019   (CH) .................................... 00146/19

(51) Int. Cl.
*H01M 8/248*         (2016.01)
*H01M 8/0276*        (2016.01)
(Continued)

(52) U.S. Cl.
CPC ......... *H01M 8/248* (2013.01); *H01M 8/0276* (2013.01); *H01M 8/2483* (2016.02); *H01M 8/0247* (2013.01); *H01M 8/247* (2013.01)

(58) Field of Classification Search
None
See application file for complete search history.

(56) References Cited

U.S. PATENT DOCUMENTS

| | | | |
|---|---|---|---|
| 2002/0034673 A1 | 3/2002 | Bisaka et al. | |
| 2002/0086199 A1* | 7/2002 | Gibb | F16F 1/377 429/470 |

(Continued)

FOREIGN PATENT DOCUMENTS

| | | |
|---|---|---|
| CN | 107146904 A | 9/2017 |
| CN | 107275662 A | 10/2017 |

(Continued)

OTHER PUBLICATIONS

International Search Report for PCT/IB2020/050962 dated May 6, 2020.

(Continued)

*Primary Examiner* — Ula C Ruddock
*Assistant Examiner* — Mary Grace Byram
(74) *Attorney, Agent, or Firm* — McDonald Hopkins LLC

(57) ABSTRACT

The fuel cell includes several assembled cells with end plates at the top and bottom of the cells that are compressed using an external retention kit. An end plate that is at the top or bottom of the assembly which separates the compression force on the active area and sealant around the cell. The end plates give the freedom and flexibility to adjust compression force on specific areas in the assembly accurately without interfering with other components and the active area.

9 Claims, 5 Drawing Sheets

(51) Int. Cl.
*H01M 8/2483* (2016.01)
*H01M 8/0247* (2016.01)
*H01M 8/247* (2016.01)

(56) References Cited

U.S. PATENT DOCUMENTS

| | | | |
|---|---|---|---|
| 2002/0110722 | A1 | 8/2002 | Yang |
| 2005/0112442 | A1* | 5/2005 | Wells .................... H01M 8/248 429/535 |
| 2006/0046127 | A1 | 3/2006 | Ishizuka et al. |
| 2006/0093890 | A1 | 5/2006 | Steinbroner |
| 2006/0115703 | A1* | 6/2006 | Kubota ............... H01M 8/0254 429/510 |
| 2006/0188771 | A1 | 8/2006 | Allen et al. |
| 2007/0042250 | A1 | 2/2007 | Inagaki |
| 2008/0014489 | A1 | 1/2008 | Nielson et al. |
| 2008/0145713 | A1 | 6/2008 | Connor |
| 2008/0305380 | A1 | 12/2008 | Andreas-Schott et al. |
| 2008/0311457 | A1 | 12/2008 | Andreas-Schott et al. |
| 2009/0305104 | A1 | 12/2009 | Matsumoto et al. |
| 2009/0317688 | A1 | 12/2009 | Inagaki |
| 2011/0027678 | A1* | 2/2011 | Nuessle ........... H01M 8/04447 429/512 |
| 2011/0250520 | A1* | 10/2011 | Lunt .................... H01M 8/242 429/468 |
| 2013/0034790 | A1* | 2/2013 | Graham ............. H01M 8/0228 429/434 |
| 2017/0025701 | A1 | 1/2017 | Tanaka |
| 2017/0104233 | A1 | 4/2017 | Armstrong et al. |
| 2018/0316039 | A1 | 11/2018 | Myers et al. |

FOREIGN PATENT DOCUMENTS

| | | |
|---|---|---|
| DE | 10003528 A1 | 8/2001 |
| EP | 1601041 A1 | 11/2005 |
| EP | 1879251 A1 | 1/2008 |
| EP | 2169754 A1 | 3/2010 |
| GB | 2509152 A | 6/2014 |
| JP | H0888018 A | 4/1996 |
| JP | 2004335336 A | 11/2004 |
| JP | 2005317388 A | 11/2005 |
| JP | 2006114362 A | 4/2006 |
| JP | 2007005169 A | 1/2007 |
| JP | 2009152123 A | 7/2009 |
| JP | 2009158381 A | 7/2009 |
| JP | 2009187778 A | 8/2009 |
| JP | 2010198861 A | 9/2010 |
| JP | 2012028194 A | 2/2012 |
| JP | 2012181996 A | 9/2012 |
| JP | 2020017416 A | 1/2020 |
| WO | 0156104 A2 | 8/2001 |
| WO | 2011123644 A2 | 10/2011 |
| WO | 2013/134789 A2 | 9/2013 |
| WO | 2016/205139 A1 | 12/2016 |
| WO | 2017131569 A1 | 8/2017 |

OTHER PUBLICATIONS

Written Opinion for PCT/IB2020/050962 dated May 6, 2020.
Notice of Opposition filed Aug. 7, 2024 in corresponding EP application 20710585.

* cited by examiner

FUEL CELL STACK WITH COMPRESSION MEANS

CORRESPONDING APPLICATION

The present application claims priority to earlier Swiss application N°CH 00146/19, filed on Feb. 7, 2019 in the name of EH GROUP Engineering SA, the content of this earlier application being incorporated by reference in its entirety in the present application.

BACKGROUND

The present invention relates to a fuel cell module and a method for manufacturing and assembling the same.

PRIOR ART AND SUMMARY OF THE INVENTION

There are several patent applications published that introduces a structure or a method by which a multi-layer stack is compressed and kept under load. For example, patent application US2017025701A1 proposed a few metallic frames that encapsulate the stack on the sides in order to keep it compressed during operation. Patent application US2018316039A1 designed a new compression mechanism where wires are wrapped around the stack. There are several other applications such as US2006093890A1, US2008145713A1, US2008311457A1, US2008305380A1, US2002086199, JP2010198861A, JP2012028194A, GB2509152A, US2006046127A1, WO2017131569A1 where various concepts are proposed for the same goal.

In all the above-mentioned applications there are two end plates at the top and bottom of the stacks, several compression springs are integrated between the end plate and last stack cell, which are compressed with the use to external compression kit. The force applied on the end plate is distributed on the active area of the cells and also the surrounding manifolds in order to minimise contact resistance between the cells and also make the assembly leakage free.

In the proposed designs there is one set of compression mechanism that is applied on the assembled stack and distributed on the active area and also the manifold area at the same time. However, key challenge is to have the possibility to apply compression on the active area and also the manifolds independently and to be able to adjust the applied force accurately. Based on the design and material used it may be necessary to apply a different compression force on the sealings around the active area than the cell itself. For instance, there are sealing materials that are prepared by injection moulding, screen printing or dispensing and the required compression force varies based on the design.

The present invention proposes a new solution which overcome this issue regardless of the design of the external compression kit. One of the main advantages of the new invention is that It provides a method with complete flexibility in the assembly that allows accurate adjustment of pressure applied either on the active area or the sealings around the cells before assembly.

Another advantage is the possibility to tweak the load applied on the active area after assembly.

Another advantage is that it assists to optimise thickness of the sealing material, which could simplify design of the plate in an assembly.

Another advantage is that, it guarantees a uniform pressure distribution on the active area especially around the cell edges that are closer to the gas manifolds.

Furthermore, the proposed solution can be used not only in low temperature fuel cells such as PEM but also any other type of low/high temperature fuel cells including SOFC, where pressure applied on the sealants are critical.

In embodiments the invention concerns a fuel cell, comprising at least one cell with an active area and a manifold area, preferably several such cells, a top end plate, a bottom end plate, a top cover, compression means, wherein said top end plate comprises a first top end plate and a second top end plate.

In embodiments, the first top end plate and/or the second end plate may each comprise compression means.

In embodiments, the first top end plate may cover the manifolds area of the fuel cell.

In embodiments, the second top end plate may cover the active area of the fuel cell.

In embodiments, the compression means may comprise springs. Other equivalent means are of course possible.

In embodiments, the springs of the first and second top end plates may be the same springs or different springs.

In embodiments, the fuel cell may further comprise compression bolts or other equivalent means.

In embodiments, the compression force on the sealant (manifold area) and around the active area may be achieved by dedicated springs on the first top end plate. In embodiments the second top end plate may be left without any compression.

In embodiments, the fuel cell may further comprise external compression means.

In embodiments, the external compression means may comprise belts or rods or other equivalent means.

In embodiments, the invention concerns a fuel cell stack with the proposed compression system and means as described herein.

In embodiments, the invention concerns a fuel cell stack where compression force on the active area and manifolds with sealants can be different.

In embodiments, the invention concerns a fuel cell stack where compression force applied on the sealants can be independent than the force applied on the active area.

In embodiments, the invention concerns a fuel cell stack where compression force on the active area can be adjusted before or after assembly.

In embodiments, the invention concerns a fuel cell stack where the compression system can be used to cure various sealing materials before or after stack assembly.

In embodiments, the invention concerns a compression system where heat or pressure can be concentrated only on the sealant around the cell.

In embodiments, the invention concerns a compression system as proposed herein that can be integrated in stacks of cells forming a fuel cell, said stacks being compressed with belts, rods, side panels or any other configuration or equivalent means.

In embodiments, the fuel cell stack assembly with the proposed compression system further comprises at least gas inlet and outlet manifolds that may be positioned at the bottom, side or top of the assembly/fuel cell.

In embodiments, the compression force on the active area may be adjusted before or after assembly of the fuel cell.

In embodiments, the compression system may be used to cure (various) sealing materials before or after stack assembly, for example in the manifold area.

In embodiments, the present invention concerns a compression system as defined in the present application that may be used for different types of fuel cells; for example, high temperature or low temperature operating fuel cells such as PEM: proton exchange membrane fuel cell, SOFC: solid oxide fuel cell, DMFC: direct methanol fuel cell, etc.)

In embodiments the present invention concerns products, devices and systems comprising at least one fuel cell as description in the present application.

BRIEF DESCRIPTION OF THE DRAWINGS

1A compression with external belts
1B compression with external rods
1C compression with side panels

DETAILED DESCRIPTION OF EMBODIMENTS OF THE INVENTION

Figure 1A:
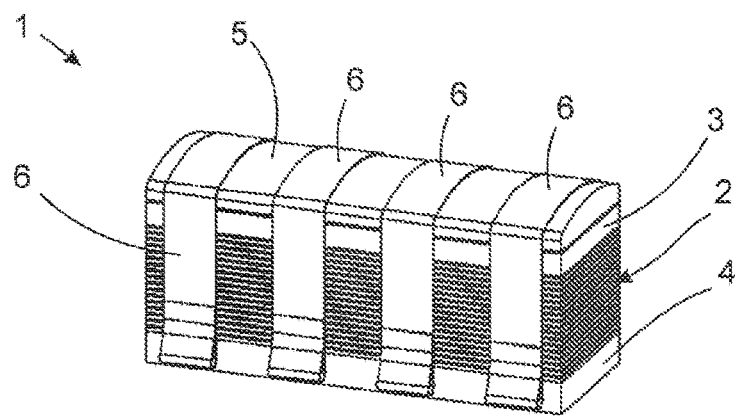
FIG. 1 illustrates examples of stack assemblies with various compression systems.
Figure 1B:
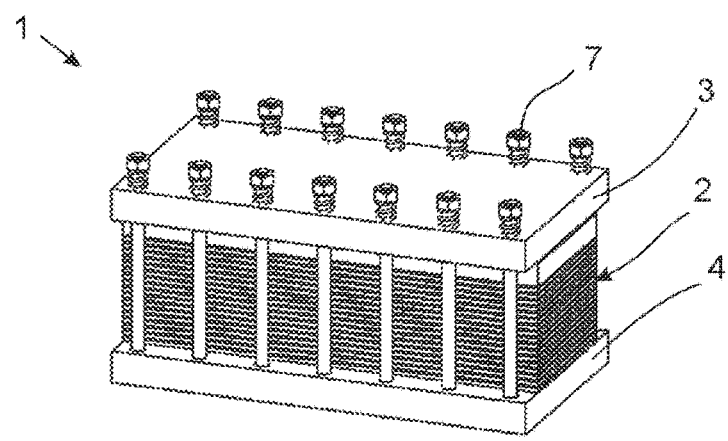
Figure 1C:
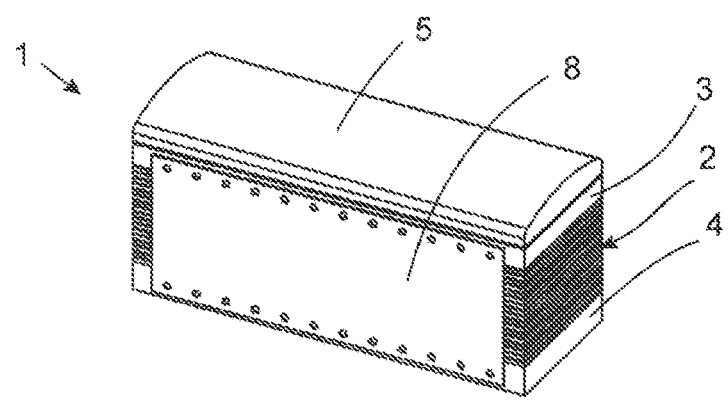

FIG. 1 represents a conventional and state of the art stack assembly 1 with compression means. The assembly forming a fuel cell comprises several cells 2 assembled on top of each other that are encapsulated with two end plates 3, 4 at the top (plate 3) and the bottom (plate 4) and with a cover 5. As stated above, there are several techniques to keep the assembly in compressed form and in FIG. 1 different solutions are shown FIG. 1A compression with belts 6 (ex. US2006093890A1), FIG. 1B rods 7 and springs (ex. US2002110722A155) and FIG. 1C side-panels 8 (ex. JP2012181996A).

Figure 2:
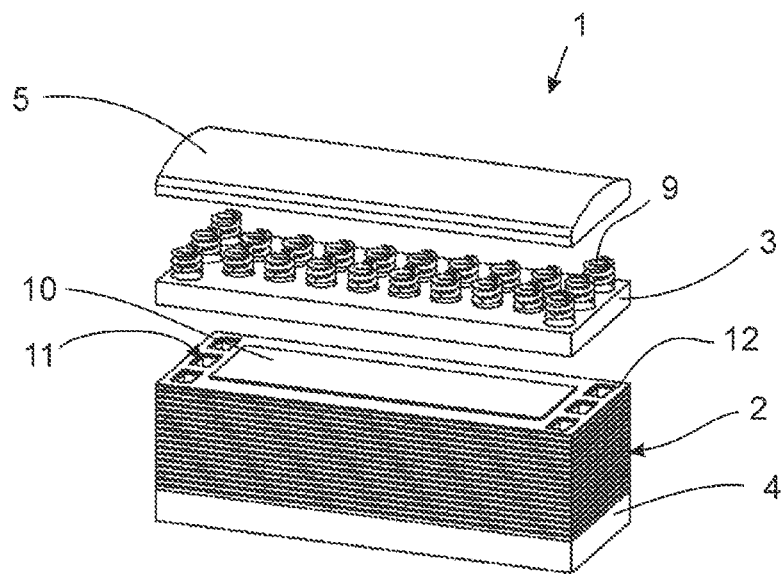
FIG. 2 illustrates an embodiment of the compression concept in a stack assembly.
Figure 3:
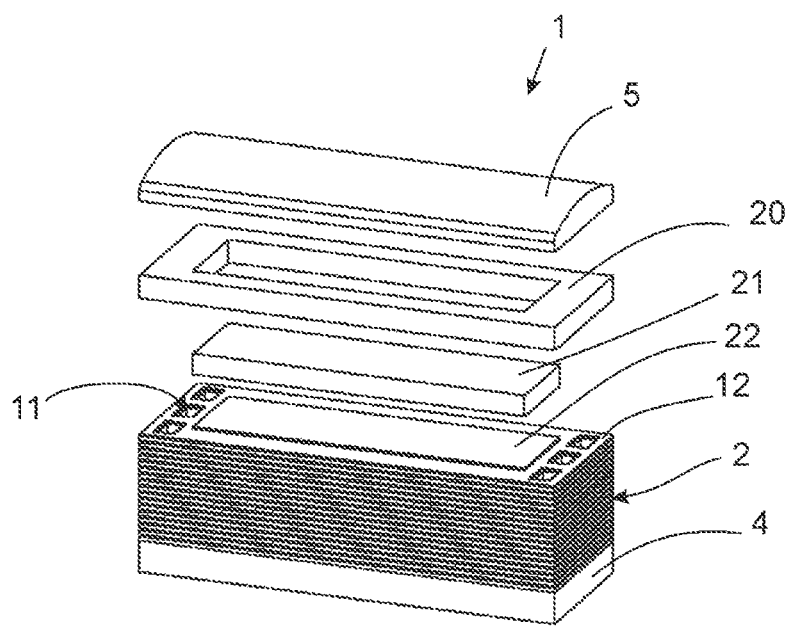
FIG. 3 illustrates a stack assembly according to an embodiment of the invention.
Figure 4:
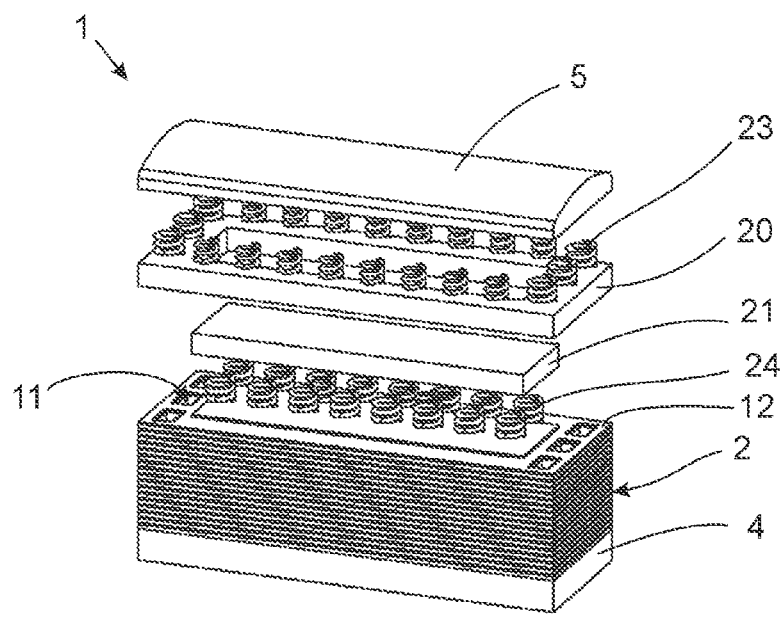
FIG. 4 illustrates an example of separate compression springs for an active area and a sealant/manifold area.

FIG. 2 shows the stack assembly 1 of FIG. 1 in an uncompressed state and exploded view. The shape and structure of the integrated compression springs 9 for compression can be different based on the design and application of the fuel cell; however, the main principle in assembly is the same. There are several compression springs 9 located between the top end plate 3 and top cover 5 or in case of rods 7 on top or bottom of the stack (FIG. 1B). The number of springs 9 and the force applied by the springs are evaluated based on the required pressure on the cells 2. For example, a pressure between 1 to 2 [MPa] can be applied on the surface of the end plates 3, 4. Different springs 9 with different compression forces can be used in the centre or on the sides of the assembly if required or according to another distribution.

In all the cases represented above, the applied pressure on the stack is distributed on the active area of the cell 2 and its surroundings where the manifolds 11 and sealings 12 are located. If it is required to increase the pressure on the sealing/manifold 11,12 area for any reason, the external compression kit should be tightened more in that area or thicker sealing materials should be used in order to compress them further and achieve this goal.

Those skilled in the art will understand the advantages of increasing pressure on the active area to reduce resistivity; however, there is a limitation on how much it can be modified as over-compression of the active area would cause damage and/or blockage of the channels.

Furthermore, during operation of the cells, the stack goes through a thermal expansion that often is larger than the expansion of the sealing materials; as a result, it may reduce the compression force on the sealant, which in turn could cause leakages on the long run.

An aim of the present invention is therefore to improve the known devices and systems.

A further aim of the present invention is to propose simple and efficient solutions to allow a proper compression of fuel cells, such assemblies and similar products.

Embodiments of the present invention introduce a new design structure (see FIGS. 3 to 9 for example) that overcomes the issues and problems mentioned above of the known fuel cells.

The end plates 3, 4 in embodiments of the present invention are structured so that there is a first separate end plate 20 ("outer or first top end plate") essentially, and preferably only, in contact with the manifold area 12 and sealant and a second end plate 21 ("inner or second top end plate") which is preferably surrounded by the first end plate 20. The second end plate 21 is essentially, and preferably only, in contact with the active area 22 of the cell; hence, the current collector 22. Of course, it is also possible to separate the top end plate in more than two plates, for example three or more. For example, the second top end plate may be formed of two plates, attached to each other or not.

In embodiments of the present invention, the fuel cell comprises compression springs 23, 24 that are located on each end plate 20, 21 separately, springs 23 being on plate 20 and springs 24 on plate 21.

This configuration allows the total force to be applied on the manifold (sealant) area 12 and active area 22 to be adjusted based on the number and type of the springs 23, 24 used in an independent manner. For example, the total force on the sealant/manifold area 12 can be adjusted to approximately 2 [MPa] and the total force on the active area 22 can be adjusted to only approximately 1 [MPa] without any interference between the parts (for example the sealant area). Springs 23 may all have the same characteristics or they may have different characteristics and the same principle is applicable to springs 24 of the active area. The values indicated are also non-limiting examples.

Another benefit is that with the current design of the embodiments according to the present invention, the total weight of the assembly can be reduced significantly. For instance, the top cover 5 and two integrated end plates 20, 21 can be produced by injection moulding with reinforced plastic, which would be rigid enough to overcome deformation. The plate 21 in the middle could be made of a lighter material as it is already encapsulated within an external frame (i.e. plate 20). Other equivalent and suitable materials are of course possible.

Another advantage of the current setup according to embodiments of the present invention is that it gives the possibility to adjust the pressure applied on the active area 22 even after a final assembly of the fuel cell.

Figure 5:
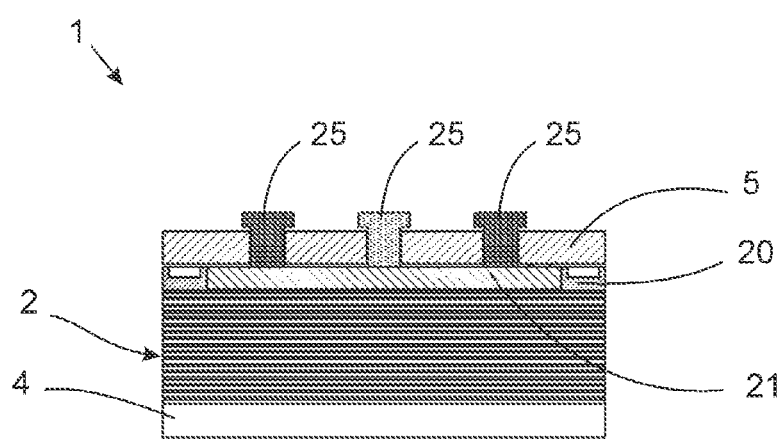
FIG. 5 illustrates an embodiment of the compression of an active area.
Figure 6:
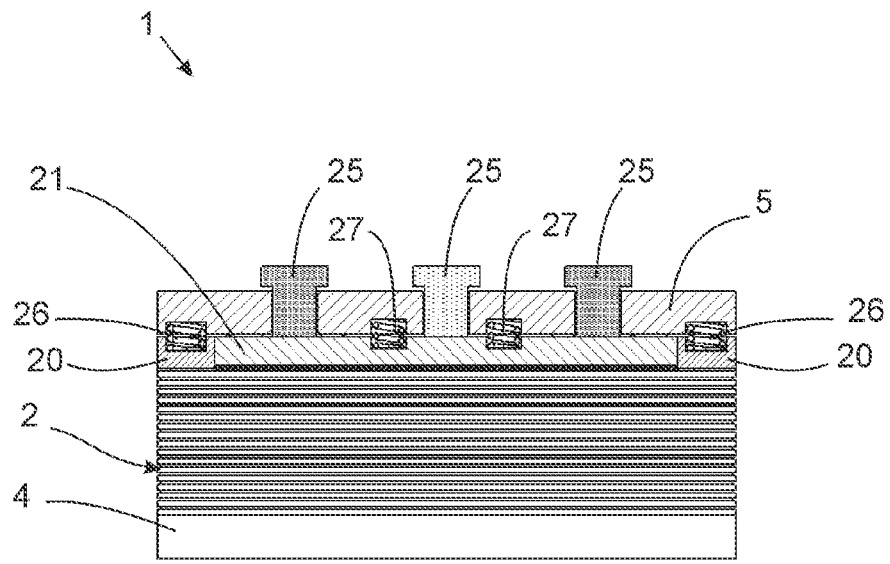
FIG. 6 illustrates an embodiment of compression springs on an active area and compression springs on the manifold/sealant area.

An example is shown in FIGS. 5 and 6: the compression force on the manifold area/sealant 12 and around the active area 22 is achieved by dedicated springs 26, 27 and top cover 5 and the end plate 21 in the middle is left without any compression means. However, in order to provide compression force to the middle part/end plate 21, several additional compression bolts 25 are added on the top of the end plate 5. The bolts 25 are in direct contact with the end plate 21 in the middle and by tightening them, the compression force applied on the active area 22 of the fuel cell can be increased gradually based on the springs used. The total of the force applied can be easily evaluated by the distance the plate 21 moves downwards. There are several other means to evaluate the force applied; for example, the use of sensors or pressure sensitive films according to embodiments of the present invention or other equivalent means.

Another advantage of the embodiments of the present invention is that the sealant 12 around the active area 22 (in the manifold area 12) may need some special treatment for activation; for example, if the sealant is made of a pressure sensitive material then it would be necessary to provide sufficient pressure in order to activate and achieve the best sealing results. This possible and simple to achieve with the principles of the present invention.

The embodiments of the present invention provide the opportunity to realise this goal without applying any force on the active area 22. After achieving satisfactory force and results on the sealant/manifold area 12, the compression in the middle part 21 can be applied similarly to what is shown in FIGS. 5 and 6. The springs 27 that are dedicated for the active area 10 will be compressed based on the force applied by the bolts 25 in the top cover 5.

Figure 7A:
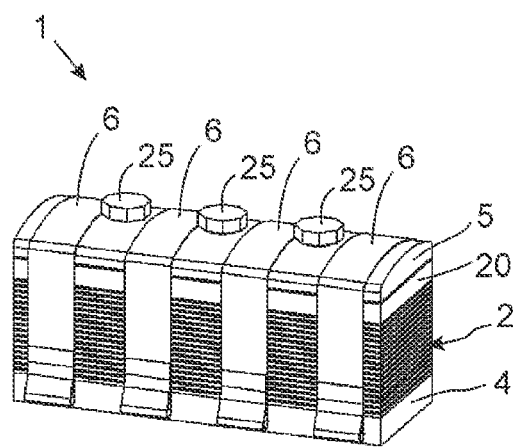
FIGS. 7A and 7B illustrate embodiments of complete assembly of fuel cells according to embodiments of the present invention.
Figure 7B:
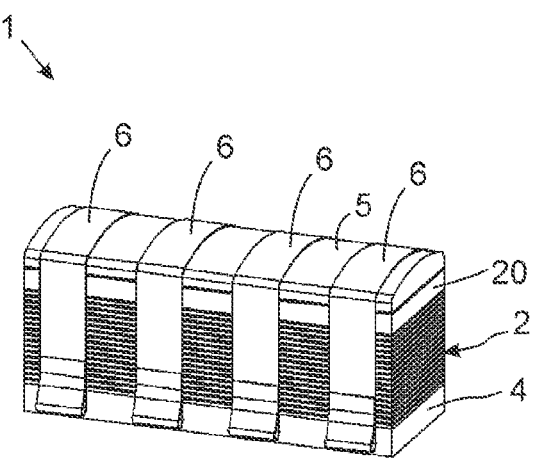

Another advantage of the embodiments of the present invention is that it can be used with various external compression mechanisms; for example (as illustrated in FIG. 1), belts or rods or any other design. An example is shown in FIG. 7 where compression belts 6 hold all the assembly together and the end plate 20, 21 configurations proposed in embodiments described herein is integrated inside the stack. The addition of external bolts 25 on top of the stack is an option and those skilled in the field can judge if they need to have such a flexibility during operation or not, therefore use such bolts or not.

Figure 8:
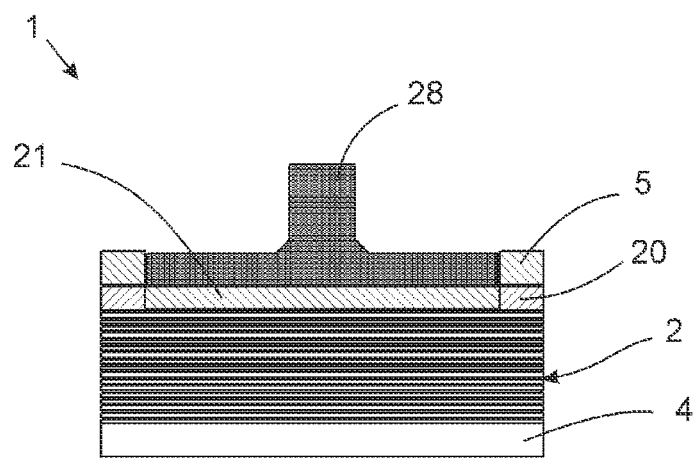
FIG. 8 illustrates an embodiment of compression means for a high temperature fuel cell.

Another advantage of the embodiments of the present invention is that they can also be used for fuel cells 1 operating at higher temperature such as SOFC (solid oxide fuel cell). For instance, in an SOFC stack based on anode supported cell assembled with glass sealant it would provide the flexibility and reliability on gas tightness of the stack. A stack can be assembled with compression mechanism similar to FIG. 1B with external springs, the connections rods can be extended in order to minimise creep and deformation due to high temperature, additional compression bars can be added in the middle of the end plates 21,22 in order to compress the active area at different pressure force—an example is shown in FIG. 8. External connection rods would compress the manifolds and sealants of the assembly and connection rods 28 in the middle (single or several) would provide compression on the active area 12.

Figures 9A, 9B:
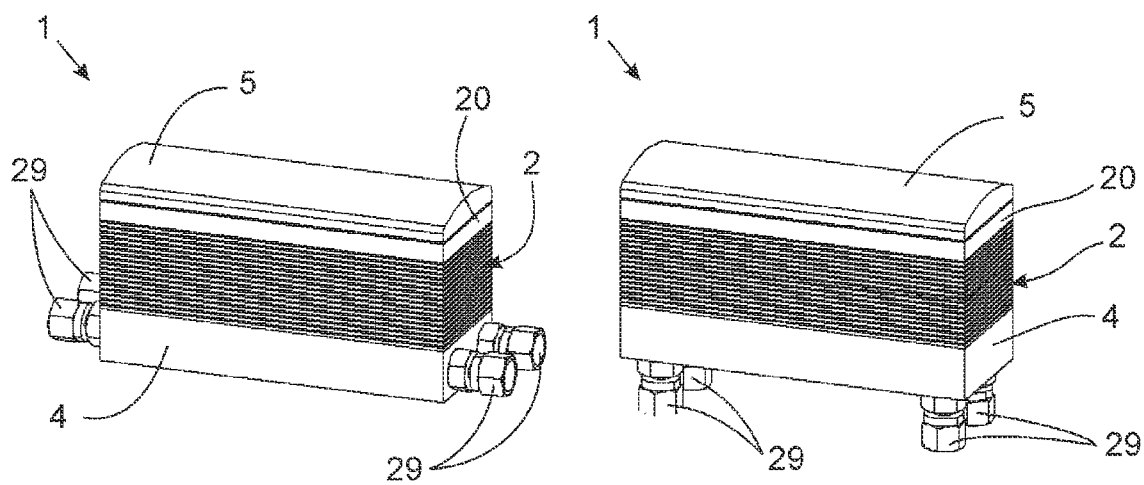
FIGS. 9A and 9B illustrate embodiments of gas supply and manifolds for an assembled fuel cell.

The embodiments of the present invention don't bring in additional complexity or limitation on gas supply and manifolds 29. A couple of examples are shown in FIG. 9. Gas connectors 29 (as examples) may be positioned on the left or right sides of the bottom end plates for they can be positioned at the bottom of the end plate 4. also, there is a possibility to integrate them on the top end plate, which is not shown here (ex. US2008311457A1).

The present description is neither intended nor should it be construed as being representative of the full extent and scope of the present invention. The present invention is set forth in various levels of detail herein as well as in the attached drawings and in the detailed description of the invention and no limitation as to the scope of the present invention is intended by either the inclusion or non-inclusion of elements, components, etc. Additional aspects of the present invention have become more readily apparent from the detailed description, particularly when taken together with the drawings.

Moreover, exemplary embodiments have been described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined not solely by the claims. The features illustrated or described in connection with an exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein with respect to embodiments of the present invention, the scope of the present invention is not so limited. Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A fuel cell, comprising at least a cell with an active area, an area around the active area and a manifold area, a top end plate, a bottom end plate, a top cover and compression means, wherein said top end plate comprises a first top end plate that covers the manifold area and the area around the active area and a second top end plate that exclusively covers the active area, wherein an independent compression force is applied separately on the manifold area and the area around the active area by dedicated springs on said first top end plate and a second independent compression force is applied separately on the active area by dedicated second springs on a lower external surface of said second top end plate.

2. The fuel cell according to claim 1, wherein said dedicated springs on said first top end plate are the same as said dedicated second springs on said second top end plate or wherein said dedicated springs on said first top end plate are different than said dedicated second springs on said second top end plate.

3. The fuel cell according to claim 1, wherein the fuel cell further comprises compression bolts.

4. The fuel cell according to claim 1, wherein said cell further comprises external compression means.

5. The fuel cell according to claim 4, wherein said external compression means comprise belts or rods.

6. The fuel cell according to claim 1, wherein said cell further comprises at least gas inlet and outlet manifolds that are positioned at the bottom, side or top of an assembly.

7. The fuel cell according to claim 1 wherein the second compression force on the active area can be adjusted before or after assembly.

8. The fuel cell according to claim 1, wherein a compression system is used to cure sealing materials before or after stack assembly.

9. The fuel cell according to claim 1, wherein the fuel cell is configured to operate at high temperature or low temperature.

* * * * *